US010957136B1

United States Patent
Kocher et al.

(10) Patent No.: US 10,957,136 B1
(45) Date of Patent: Mar. 23, 2021

(54) INFORMATION-BASED, BIOMETRIC, ASYNCHRONOUS ACCESS CONTROL SYSTEM

(71) Applicants: Robert William Kocher, McLean, VA (US); Douglas Earl Dyer, Herndon, VA (US)

(72) Inventors: Robert William Kocher, McLean, VA (US); Douglas Earl Dyer, Herndon, VA (US)

( * ) Notice: Subject to any disclaimer, the term of this patent is extended or adjusted under 35 U.S.C. 154(b) by 0 days.

(21) Appl. No.: 16/806,503

(22) Filed: Mar. 2, 2020

Related U.S. Application Data

(63) Continuation of application No. 16/350,247, filed on Oct. 19, 2018, now Pat. No. 10,810,816.

(51) Int. Cl.
| | |
|---|---|
| G07C 9/23 | (2020.01) |
| H04L 9/32 | (2006.01) |
| G06F 21/32 | (2013.01) |
| G07C 9/25 | (2020.01) |

(52) U.S. Cl.
CPC .............. *G07C 9/23* (2020.01); *G06F 21/32* (2013.01); *G07C 9/25* (2020.01); *H04L 9/3213* (2013.01); *H04L 9/3231* (2013.01)

(58) Field of Classification Search
CPC ........... G06F 21/32; G06F 21/34; G07C 9/00; H04L 29/06; H04L 63/10; H04L 63/06; H04L 12/28; B60R 25/00
USPC ....... 340/5.52, 573.1, 517, 521, 5.6, 5.7, 5.8
See application file for complete search history.

(56) References Cited

U.S. PATENT DOCUMENTS

| | | | | |
|---|---|---|---|---|
| 6,593,856 B1* | 7/2003 | Madau | ............... | G05B 19/0428 340/12.27 |
| 6,958,676 B1* | 10/2005 | Morgan | ............... | G07B 15/063 340/5.72 |
| 7,898,385 B2* | 3/2011 | Kocher | .................... | G07C 9/28 340/5.52 |
| 8,174,357 B2* | 5/2012 | Geerlings | .............. | G08C 19/28 340/5.64 |
| 8,620,487 B2* | 12/2013 | Cochran | ................ | G07C 9/257 701/1 |
| 9,003,196 B2* | 4/2015 | Hoyos | ..................... | G06F 21/34 713/186 |
| 9,197,636 B2* | 11/2015 | Varshavsky | ............. | G06F 21/32 |
| 9,396,598 B2* | 7/2016 | Daniel-Wayman | ......................... | H04L 63/105 |
| 9,576,412 B2* | 2/2017 | Gudmundsson | ......... | G07C 9/33 |
| 9,626,859 B2* | 4/2017 | Ribas | ................ | G07C 9/00817 |

(Continued)

Primary Examiner — Nam V Nguyen

(57) ABSTRACT

An information-based access control system for facilities. The control system includes a mobile app and securely connected central server, which is cloud-based. The app collects and transmits multiple biometric and other authentication factors and the facility enabling the server to verify identity and check to ensure the person is authorized to obtain access. If so, the server issues a limited-duration access token, which can be displayed to the facility guards and transmitted to signal lights and electronic gates to obtain access quickly, conveniently, inexpensively, and securely. In another exemplary embodiment, a vehicle on the move can acquire access without having to slow down or stop. In this exemplary embodiment, an RFID device in a person's vehicle who is seeking access is provided, along with an RFID reader which obtains approval, based on the multiple authentication factors and the RFID tag, to permit access to the moving vehicle.

12 Claims, 3 Drawing Sheets

(56) References Cited

U.S. PATENT DOCUMENTS

| | | | | |
|---|---|---|---|---|
| 9,640,002 B1* | 5/2017 | Grosberg | ............ | G07C 9/00571 |
| 9,646,165 B1* | 5/2017 | Saylor | ..................... | E05B 49/00 |
| 9,942,056 B2* | 4/2018 | Lin | .................... | G08B 21/0294 |
| 9,990,787 B2* | 6/2018 | Capaldi-Tallon | ......... | G07C 9/28 |
| 10,083,554 B2* | 9/2018 | Mattern | ................. | G07C 9/257 |
| 10,229,548 B2* | 3/2019 | Daniel-Wayman | ......................... G07C 9/00309 | |
| 10,475,264 B2* | 11/2019 | Jin | ..................... | G07C 9/00571 |
| 10,505,938 B2* | 12/2019 | Love | ................. | G07C 9/00309 |
| 10,810,816 B1* | 10/2020 | Kocher | ................ | H04L 9/3213 |

* cited by examiner

INFORMATION-BASED, BIOMETRIC, ASYNCHRONOUS ACCESS CONTROL SYSTEM

CROSS-REFERENCE TO RELATED APPLICATION

This application claims priority from U.S. Non-Provisional Patent Application Ser. No. 16/350,247; titled "Information-based Biometric, Asynchronous Access Control System" filed on Oct. 19, 2018. This application also claims priority from U.S. Provisional Patent Application Ser. No. 62/765,174; titled "Information-based, Biometric, Asynchronous Access Control System" filed on Aug. 28, 2018; the contents of which are incorporated herein by reference, in their entirety.

FEDERALLY SPONSORED RESEARCH

None

BACKGROUND OF THE INVENTION

The invention relates to the field of providing access to a facility such as a military base, and in particular to an information-based, biometric, asynchronous access control system.

Description of the Related Art

Traditionally, access control for military bases is provided at a vehicle gate by guards checking ID cards. In operation, the guard cheeks the ID card of the individual seeking access in order to ensure that the ID card has not expired and is not an obvious forgery. The guard compares the photo on the ID card with the face of the person seeking access. This traditional method suffers from low throughput (less than 6 vehicles per minute, per lane); high costs of manual labor (1 guard per lane), and potential security holes (either through forged documents or stolen documents used by look-alikes). Document security measures and database checks improve some security issues while detracting from other security measures such as the time spent on photo-to-face comparison. Methods of identifying persons based on identifying the vehicle, including license plate recognition, vehicle barcodes, and RFID transponders result in errors from many sources, including failure to correctly identify the vehicle and tenuous association of a vehicle with the person or persons inside. Using such authentication methods to verify are problematic and ill-advised since none of these methods keep information confidential. Identification methods using license plates, vehicle barcodes, and RFID transponders may all be read at a distance and replicated by a determined adversary. Automated readers that scan the ID card are not secure since ID card barcodes may be easily read and replicated on forged documents. Document security measures may all be subverted by a talented counterfeiter with technology similar to the document publisher. Any semi-manual method that detracts from a biometric comparison such as the face-matches-photo determination is detrimental to security. Furthermore, introducing technical equipment for identity verification at a gate is usually very expensive and problematic for many reasons, including the need for environmental protection. Previous solutions also fail to capture information that would improve security, such as duplicate identities and normal access patterns.

An information-based approach similar to ones used for computer systems has the potential to improve security, increase throughput, and lower costs through automated checking, in addition to enhancing convenience for users. Multi-factor authentication is more secure and effective for verifying identity, and biometrics such as face, are particularly convenient for the user and are accurate based on current facial recognition and other biometric algorithms. An adversary hoping to gain access to the facility would need to have known the user's secrets (like personal identification number [PIN], have objects identical to the user's objects (like mobile device and RFID), and appear to be the user (biometrics such as face) are very hard to achieve. Using both a mobile app and the user's own mobile device, and a biometric such as a face photo can be collected and information transferred without great cost of new equipment. Using a central server, enrollment information may be combined with current threat conditions, facility-specified authorized personnel, and analytical algorithms to tailor authentication requirements and access control. By permitting users to request and receive access decisions before arriving at the gate (asynchronously), less time is required to get through the gate, reducing traffic backups and saving everyone time. Security guards can spend more time on physical security threats and exceptions thanks to automated authentication and access control. Fewer security guards may be required, thus reducing labor costs. By avoiding technologies that don't add value, the system can be relatively inexpensive.

SUMMARY

To improve security, reduce manual effort, human errors, and increase throughput, a smart phone app and central server can work in conjunction to securely verify identity and check that the person is authorized to gain access to the facility; and the user can have a limited-duration access token which is used to gain access. This process can occur prior to arriving at the gate, reducing the time needed at the gate and increasing throughput so traffic does not back up. At the gate, the access token can be displayed or transmitted to satisfy guards or actuate access control equipment such as signal lights and electronic gates. Security is improved because, depending on policy and a desire for user convenience, 1, 2, 3, or more authentication factors may be used to verify identity, and all system information is kept confidential via encryption and other information assurance methods. With automation, the guards have less distracting labor and can better focus on physical security threats and exceptions. Because the central server has a database, it's easy for facilities to limit access to particular people, and all access data are recorded and potentially analyzed to obtain insights and further improve the security of the facility. Because the solution can reuse infrastructure already available, including individual's smart phones and their network connectivity; great benefits are achieved without great cost. In another exemplary embodiment, as shown in FIG. 2, in addition to the multiple types of authentication of a person seeking access to a base, an RFID device in the vehicle of the person seeking access to the facility transmits an RFID tag to an RFID reader located at a gate of the facility that the person seeking access is approaching. The received RFID tag, along with the authentication information can both be verified at an access control center at a cloud server; wherein the person seeking access can be granted access to the facility without having to stop at the gate.

LIST OF THE REFERENCE NUMERALS FOUND IN THE DRAWING

Figure 1:
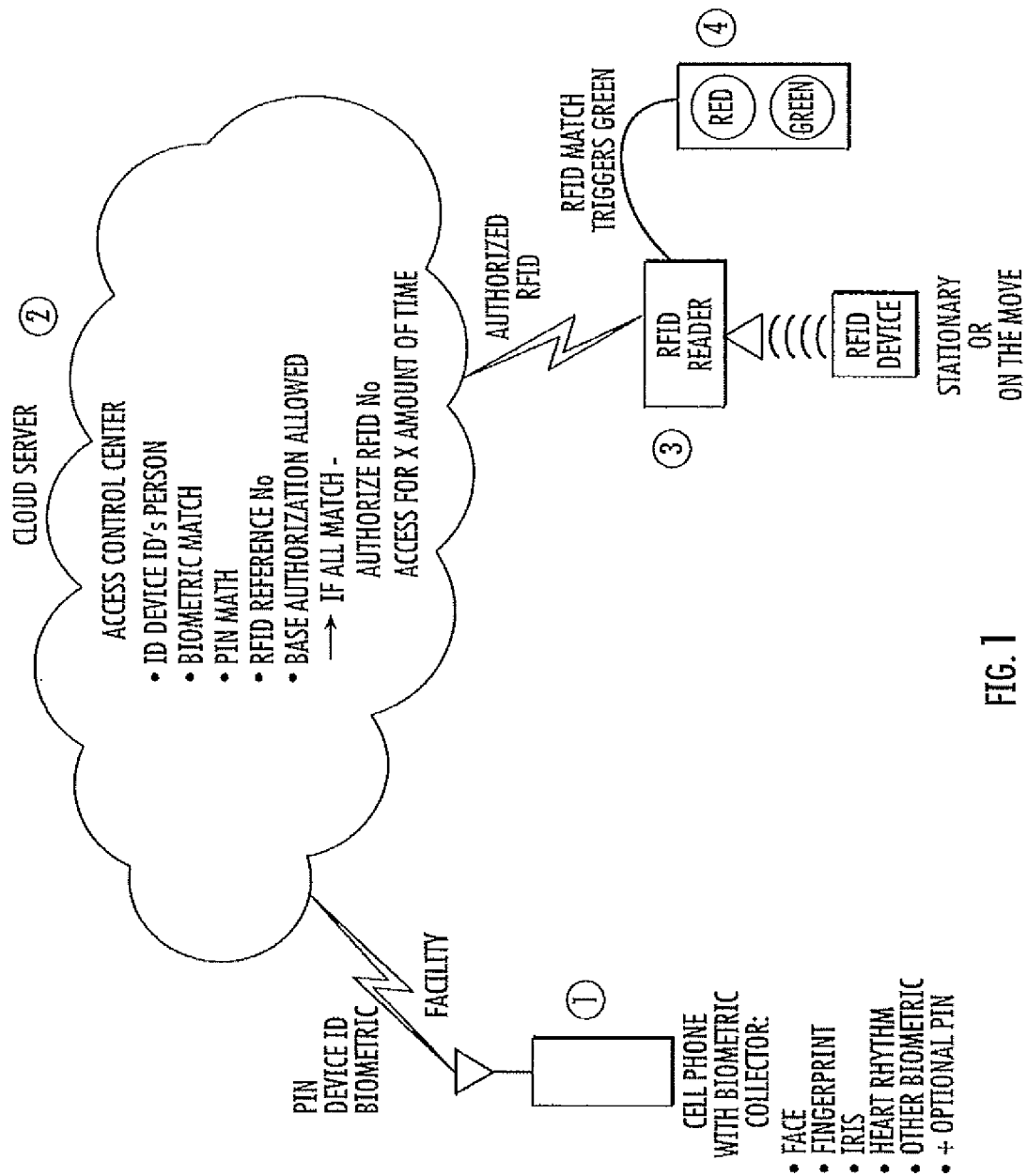
FIG. 1 illustrates an exemplary view of the primary components of the system.

1 Mobile device such as a smart phone
2 Cloud server
3 RFID reader
4 Signal light
5 Director is a computer which signals drivers into or out of the Pre-Pass lane
6 Verifier which represents a set of equipment used to verify that a vehicle in the Pre-Pass lane should be admitted through the gate
7 RFID-D represents a computer equipped with an RFID reader
8 Pre-Pass lane which is a traffic lane designed for on-the-move, secure vehicle access.
9 Normal lane which is a traffic lane for general purpose access.
10 RFID-V which is a computer equipped with an RFID reader and a vehicle sensor 11.
11 VS represents a vehicle sensor.
12 A represents an arrow light with 2 arrows used to direct drivers to stay in the Pre-Pass lane 7 or move to the normal lane 9.
13 is a red light/stop light.
14 is a gate of the facility.
15 is a car(s) that does not qualify for the Pre-Pass Lane.
16 is a car(s) that does qualify for the Pre-Pass Lane.
17 is the Arrow Verification RFID Reader.
18 An arrow light with one or more arrows used to direct drivers to use the Pre-Pass Lane
19 An RFID tag associated with a driver
20 Five Factors of Authentication
21 Base Authorized Access Center
22 Verification RFID Reader
23 Security guard
24 Pre-Pass Lane
25 Standard Access Lane
26 Standard Access System is an external system of some kind which is not part of the invention but may provide security-related information for drivers in the Standard Access Lane (25)

DETAILED DESCRIPTION OF THE EXEMPLARY EMBODIMENTS

The components of FIG. 1 include an app running on a mobile device such as a smart phone 1. The smart phone illustrated includes a transponder for transmitting bio-metric information such as an image of a person's face; a fingerprint, a picture of a person's iris; the heart rhythm of the person; other biometrics and an optional pin number. The central server in the cloud 2 includes network connectivity and running programs including a database and access control (software) server. An RFID reader 3 at is provided at the facility gate. The RFID reader 3 communicates with the cloud server 2 and an RFID device 3. The RFID reader 3 is placed at or near the gate 14 and interacts with vehicles which are stationary or on the move. Access control equipment 4 includes control equipment such as signal lights; and data elements and communication flows with the RFID reader 3. Information-based access control includes three activities: (1) authenticating, or verifying the identity of the person seeking access, (2) authorizing, which verifies that the identified person should have access according to the facility policy, and (3) acting to communicate and facilitate access through signaling ("green light" if access is granted or "red light" if access is rejected) and also opening/closing electronic gates. Of these, the first activity, authentication, is most difficult. Authentication begins with a claim of identity and includes evidence that can be used to decide whether the claim is true. Ideally, authentication evidence is provided in several different and independent ways, such as something you know (a secret other people do not know such as a computer password or PIN); something you have (an object that belongs only to you); and something you are (a biometric that differentiates you from others). A common example of authentication is when you log in to your computer. Your user name is a claim of identity—the computer account associated with you. Your password (something you know) is one item of evidence that your claim is true. When you log in, your computer checks your password, and if it matches the known password for your account, then the computer allows access. Some computers are set up to require two-factor authentication that includes both a password (something you know) and a time-based on-time-PIN from a smart phone app which shares a secret with a server. Two-factor authentication is better evidence that your claim of identity is correct because the two factors are more-or-less independent of one another. Someone could crack your password but they would not have your phone or access to your time-based on-time-PIN and as a result could not obtain access. For reasons like this, two-factor authentication is regarded as more secure than a single factor like a computer password. It's possible to have three-factor authentication or use even more factors if desired. Humans, being fallible, make mistakes such as forgetting passwords, choosing passwords that are easy to guess, or writing down passwords so that others might find them; losing objects; failing to follow instructions; and rejecting procedures for reasons of inconvenience even when failing to follow instructions increases security risks. A good access control system works despite human failings; takes advantage of new technologies as they become available, and use all available evidence to make good decisions in order to optimize convenience, throughput and security. When conditions change, the security system should be able to adapt quickly; for example, in response to a threat increasing, perhaps the number of required authentication factors increase and authorization could change.

Traditional access control based on ID card checks provides only a document as authentication evidence, and documents may be forged or stolen. In contrast, information-based access control is based on a central database which is easier to secure and manage in addition to being aster to update; thus improving security in response to changing conditions. The central database includes both authentication and authorization information. If desired, the central database can also automate access decisions and provide control signals to signal lights, gates and other access control equipment. Of course, a network is required to connect the database to these field elements, but networks e now ubiquitous. For example, any security gate lacking network connectivity may be connected via a cellular hot spot for about $30/month, and the bandwidth provided is sufficient because control information is quite compact. An alternative to a network is to distribute the database through the use of Distributed Access Cards (DAC). The DAC is one example of a security card for a distributed database. A DAC satisfies the requirement for two-factor authentication: something the user knows combined with something the user has. But the economics favor centralization and dependence on a network.

Authorization is based on the role of the person identified in authentication. Authorization is a policy that may be changed according to the dynamic situation. Once identity is authenticated, making access decisions based on authorization is rather trivial and will be correct so long as policy is kept up-to-date. After authentication and authorization checks, there is sufficient information to decide and act upon. If a person successfully authenticates and has adequate authority, then the decision is to grant access. In this case, the system must support communication necessary to act in support of access. Typically, this includes notifying the guard as well as the person seeking access and providing control signals to open a gate. If there is good synchronization, then the system might provide these actions directly. Alternatively, the system can support asynchronous service by providing the person requesting access with a token that can be used to inform the guard and the local access control equipment for appropriate response.

An information-based access control system that operates synchronously works in this way. A person wishing access has to send a claim of identity with one or more authentication factors that provide evidence that the identity is correct. In addition, the person includes the particular facility (facilities restrict access to particular people). The system considers the information, comparing it with known information in a database, then provides an access determination to security personnel, perhaps sends signals to automated access control equipment such signal lights and electronic gates, and may also provide the access determination back to the person seeking access. All communications and devices are secure and provide basic information assurance. Because the system is operating synchronously, all these actions must occur at the gate as each vehicle approaches; no vehicle can begin the process before the vehicle in front completes the process and is admitted through the gate (or rejected).

Practically, the system should operate asynchronously since there are often multiple vehicles entering the gate at once and because it saves time to be approved for access before a user arrives at a gate. This changes the design only slightly. In the "green light" case, the system issues an access token to the person seeking access and also to the security personnel and access control equipment. Because tokens are supplied asynchronously, the security personnel and access control equipment will, in general, have a set of expected tokens. When a person seeking access arrives at the gate, they present their token, and if it is in the set of expected tokens, access is provided. That particular token is removed from the set shortly afterwards to prevent covert reuse.

One benefit of this design is that the person seeking access knows immediately if they have access and can correct a problem (e.g. via a new access request) or be prepared to request a secondary security protocol.

There are many ways to provide information and receive an access token. The simplest, most reliable, inexpensive, and most convenient way is to use an app on an Android or iOS smart phone. According to the Pew Research Center, as of 2018, more than 90% of 18-49-year-olds in the U.S. have a smart phone; a figure that has been increasing every year. Smart phones are essentially computers with many built-in peripherals (e.g. GPS, camera), a USB connector for attaching external peripherals (e.g. fingerprint or iris scanner or other biometric device), and near-continuous connectivity to a digital network. They protect data by securing both data at rest and data in transit. It's easy for a user to download an app, set it up during enrollment, and use it to securely authenticate and receive an access token.

One method of presenting a user's access token is for the server to send something that can be quickly and reliably sensed along with the access token to the facility. For example, if the user's vehicle has an RFID transponder or tag, then the associated RFID code can be sent by the server along with the user's access token. In the asynchronous case, that means the facility will have a dynamic set of access tokens with associated RFID codes. Any vehicle approaching with one of the RFID codes has a user who should obtain access. Any vehicle with no RFID or an RFID that does not match any in the set should not receive access. After a vehicle is admitted, the access token associated with its RFID code is removed from the set. Note that the RFID is not being used as an authentication factor—it should not serve in this capacity since its code can be read and replicated by anyone. Instead, it is used, during the limited duration when an access token is valid, to recognize someone who should get access. If some other person tries to use a duplicate RFID to gain access, the problem is very quickly made obvious since two vehicles cannot gain access using one access token.

The operation of an exemplary embodiment is to enroll and set up the smart phone app. Assuming network connectivity, the user enters their identity in the form of a Unique ID Number, presses a button to take a face photo or other biometric (this step may be repeated as needed), presses a button to take a photo of their issued ID card (this step may be repeated as needed), enters a unique PIN for access and also a PIN for a distress code (to be used to summon help in the case of coercion), then presses a button to enroll. Enrolling securely sends the Unique ID Number, face photo or other biometric, and ID card photo, and PINs to a server which takes several steps to verify the user's identity. The system obtains the ID card photos from a database and compares the face photo submitted using a facial recognition algorithm and a policy-established similarity threshold (or, similarly for an alternative biometric). If there is sufficient uncertainty in the facial similarity, the face photos are provided to a trained facial examiner for determination (in which case, the user must wait until the determination is made; and similarly for au alternative biometric). The system also analyzes the ID card photo for any signs of forgery.

If the system's analysis verifies the user's identity and ID card, the system responds with a unique secret that it now associates with that user by saving it on a server. The user's app saves the shared secret in an encrypted file along with the user's DOD ID Number. The shared secret will be used, in the future, to create a time-based one-time PIN (TOTP) to provide one factor of authentication (something you have, namely, your phone). This is analogous to Google Authenticator and similar apps used for two-factor authentication in computing. Enrollment is now complete (estimated time: ~2 minutes).

To use the app for base access, the user starts the app when their vehicle is stopped near the gate. The app may be started normally or using voice commands ("OK Google, open InSec"). The user presses a button in the app and then looks at the phone's front camera. The app takes a face photo (something you are), then sends the access request over a secure HTTPS connection to the server. The request includes DOD ID Number, TOTP, face photo, and the location of the facility. The server verifies the TOTP (user's phone) and face photo (user's face, via a facial recognition algorithm) for the DOD ID Number, and checks the user's authorization for the facility. Upon success, the server returns an access token which is a unique secret also provided to the security personnel and equipment at the gate. This process takes 2-3 seconds. Upon arriving at the gate, the user presents the token to gain access. One convenient method of presenting the token is in the form of a QR code which can be read very quickly by a mounted or hand-held barcode reader or a guard's own phone. Another convenient method, provided that the user's vehicle has an RFID tag and the facility gate has an RFID reader, is to have the server send the access token along with user's RFID code so that the user can be automatically detected at the gate and provided access. In any event, the access token is valid for only a short time such as 5-15 minutes, enabling the user to safely obtain an access token prior to arriving at the gate; which reduces the time required at the gate for authentication and authorization checks. After a successful request, the smart phone app displays the QR code representing the access token for a certain limited amount of time after which it disappears. When presented, the QR code is interpreted or the RFID code detected, and the resulting token is compared with a set of expected tokens. If not found, access is denied and the user is shunted to a secondary protocol. If access is granted, the person is granted access and that token is then removed from the set shortly afterwards, to prevent nefarious reuse.

Not shown in FIG. 1, but understood to exist are software components, the actual hardware server in the cloud and a local computer at the facility gate which reads the RFID codes from the RFID reader and controls the access control equipment, which might include an electronic gate in addition to signal lights, like a stoplight. The cell phone is a smart phone with built in peripherals such as a camera and GPS and includes an USB interface to support connection to external devices such as other biometric readers for collecting biometrics other than face; such as fingerprint, iris, heart rhythm or other biometric. Software in a smart phone app enables initial enrollment and day-to-day access requests and access token receipt. The cloud server includes one or more biometric recognizers such as facial recognition in addition to system software. The RFID reader is connected to a local computer at the facility which is able to receive access tokens and associated RFID codes from the server. A signal light is also connected to the local facility computer which controls the signal light.

The information-based, biometric, asynchronous access control system described greatly improves security, convenience, and throughput over current methods based on ID card checks. Because it is based on ubiquitous mobile devices, it achieves these advantages at low cost. The system described is flexible and adaptable so that it can take advantage of new technologies as they arise, and change the authentication factors and authorizations as the threat conditions change at the facility.

Figure 2:
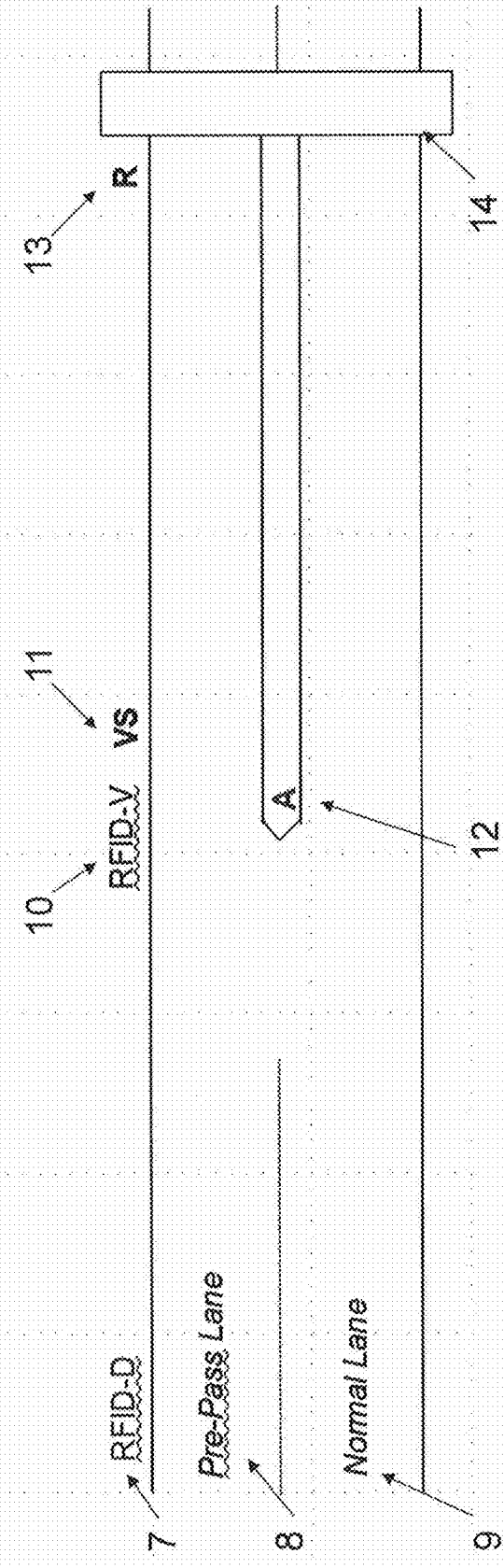
FIG. 2 illustrated an additional exemplary embodiment relating to on-the-move vehicle access.

Turning to FIG. 2, this figure illustrates another exemplary embodiment of the invention. Essentially, the invention uses RFID which has been activated for some period of time by virtue of a central computer (a national access control center (NACC) server) receiving an access request from a user (which includes the user's ID number, the user's PIN, the user's phone time-based PIN, and the user's face photo plus the desired location) and, if that access request, after checking, is made by an authenticated and authorized user, the central computer replies with a confirmation—an access control secret with the user's ID number. It sends the confirmation and time window back to the user and also sends the confirmation, time window, and the user's RFID code to the base gate computer. If the user shows up at the gate during that time window, the gate computer recognizes the RFID code, can associate that RFID code with the user's ID number and other information, checks to see if there is a current confirmation, for that user, and if so, effects access control equipment to permit entry. The access control equipment includes lane signal lights, a stop light, and an audible alert. There can also be a boom gate or other equipment used to physically stop the car when access is denied.

One aspect of vehicle access on-the-move is vehicle safety. It is possible that a driver without a current confirmation will be in the specially designated on-the-move lane, whether that's someone isn't enrolled or a valid user who's forgot to request access or a valid user whose confirmation expired, perhaps. Whatever the reason, that driver should safely leave the specially designated on-the-move lane for the normal lane where another access protocol will be used (e.g. a manual ID card check). To support safe, smooth, vehicle operations, the method of this exemplary embodiment is to direct the driver into the normal lane, and our system includes an RFID reader, computer that checks the associated user's confirmation, and sets a lane arrow light accordingly.

Another aspect ensuring security. If a driver without a confirmation ignores the arrow lights 12 and inappropriately remains in the designated on-the-move lane 8, a vehicle sensor 11 detects the vehicle and triggers a check to see if a second RFID 10 reader has found a driver with a confirmation. If not, the gate computer associated with that second RFID reader 10 causes other access control equipment to stop the driver and alert security guards. That other access control equipment might be a traffic light and/or a boom gate (which drops its arm to stop the vehicle). Alerting the guard can be done audibly (for example, a school bell) or using a graphical alert on a guard's workstation.

Looking at a prototypical gate 14 with 2 lanes entering, consider the figure below: As shown in FIG. 2 is an exemplary embodiment of a two-lane system which has a Lane Director 5, which is a set of equipment used to direct drivers into the Pre-Pass lane 8 or the normal lane 9, as is appropriate. The equipment includes a computer RFID-D 7 equipped with an RFID reader 3. The computer RFID reader 10 receives confirmations from a central server 2 and can check and see if an RFID code or tag read from a vehicle corresponds to a confirmation of authorization for access. If so, this computer RFID-D 7 will use arrow signal light 12 to signal the driver to remain in the Pre-Pass lane (8). If not authorized to acquire access to the facility, this computer will use the arrow signal light 12 to signal the driver to change to the normal lane (9). Element 6 represents a Gate Verifier. This is a set of equipment used to verify that a vehicle in the Pre-Pass lane 8 should be admitted to the facility through the gate 14. Element 8 represents a traffic lane designed for on-the-move, secure vehicle access through gate 14. As further shown in FIG. 2, element 9 represents a normal traffic lane for general purpose access through gate 14 in which security is ensured using some other mechanism, such as a manual ID card check by a guard. Element 10, RFID-V represents a computer equipped with an RFID reader and a vehicle sensor 11. The computer receives confirmations from a central server 2, senses vehicles passing, and can check and see if an RFID code read from a vehicle corresponds to a confirmation. If a vehicle passes and either no RFID code is read or the RFID code read does not correspond to a current confirmation of authentication, then this computer will turn on a red/stop signal light 13 which can optionally also trigger an audible alarm such as an electric bell to alert guards. These actions should result in stopping a driver who does not have a confirmation. The stopped driver will interact with a security guard who will provide further instructions. If a vehicle passes and an RFID code read corresponds to a current confirmation, then this computer takes no action, permitting secure access through gate 14 via the Pre-Pass lane 8. Element 12 represents an arrow light with 2 arrows used to direct drivers to stay in the Pre-Pass lane 8 or move to the normal lane 9. This arrow light is controlled by RFID-D computer 7. Element 13 represents a red light /stop light, which is controlled by RFID-V computer 10. Lastly, gate 14 defines the security boundary through which the Pre-pass lane 8 and normal lane 9 pass.

The embodiment of FIG. 2 includes RFID device and reader 3, which has been activated for some period of time by virtue of a central computer (a national access control center (NACC) server receiving an access request from a user (which includes the user's ID number, the user's PIN, the user's phone time-based PIN, and the user's face photo plus the desired location) and, if that access request, after checking, is made by an authenticated and authorized user, the central computer replies with a confirmation—an access control secret with the user's ID number. It sends the confirmation and time window back to the user and also sends the confirmation, time window, and the user's RFID code to the base gate computer. If the user shows up at the gate during that time window, the gate computer recognizes the RFID code, can associate that RFID code with the user's ID number and other information, checks to see if there is a current confirmation, for that user, and if so, effects access control equipment to permit entry. The access control equipment includes lane signal lights, a stop light, and an audible alert. Alternatively, there can be a boom gate or other equipment used to physically stop the car.

The specially designated, on-the-move lane is labeled "Pre-Pass Lane." In this diagram, there are two RFID sensors, each with a computer and associated access control equipment. The first RFID sensor is labeled Director, and it's job is to signal any driver without a confirmation to leave the on-the-move lane. This is performed using a pair of arrow lights marked A in the diagram. These elements show up in the RFID-D in green. The second RFID sensor is labeled Verifier. The job performed by Verifier is to verify that all drivers that remain in the on-the-move lane have confirmations. This is performed using a vehicle sensor (not shown in this diagram). If the vehicle sensor triggers AND the RFID sensor has not detected a confirmed user, then the Verifier computer uses access control equipment to stop the vehicle (using a traffic light. and/or boom gate) and alert security guards (using, for example, a school bell.

With respect to how the computers associated with each of the RFID sensors know which RFID codes are associated with confirmed users, these computers are connected to a secure network and receive constant updates from the central computer (a national access control center (NACC) server).

The current patent suggests that it is the access token displayed on the user's phone that is used to grant access. It's possible to use that if you stop the vehicle, but a barcode on a driver's phone can't be read on-the-move with today's barcode-reading equipment. Instead, we use RFID to identify the driver.

Figure 3:
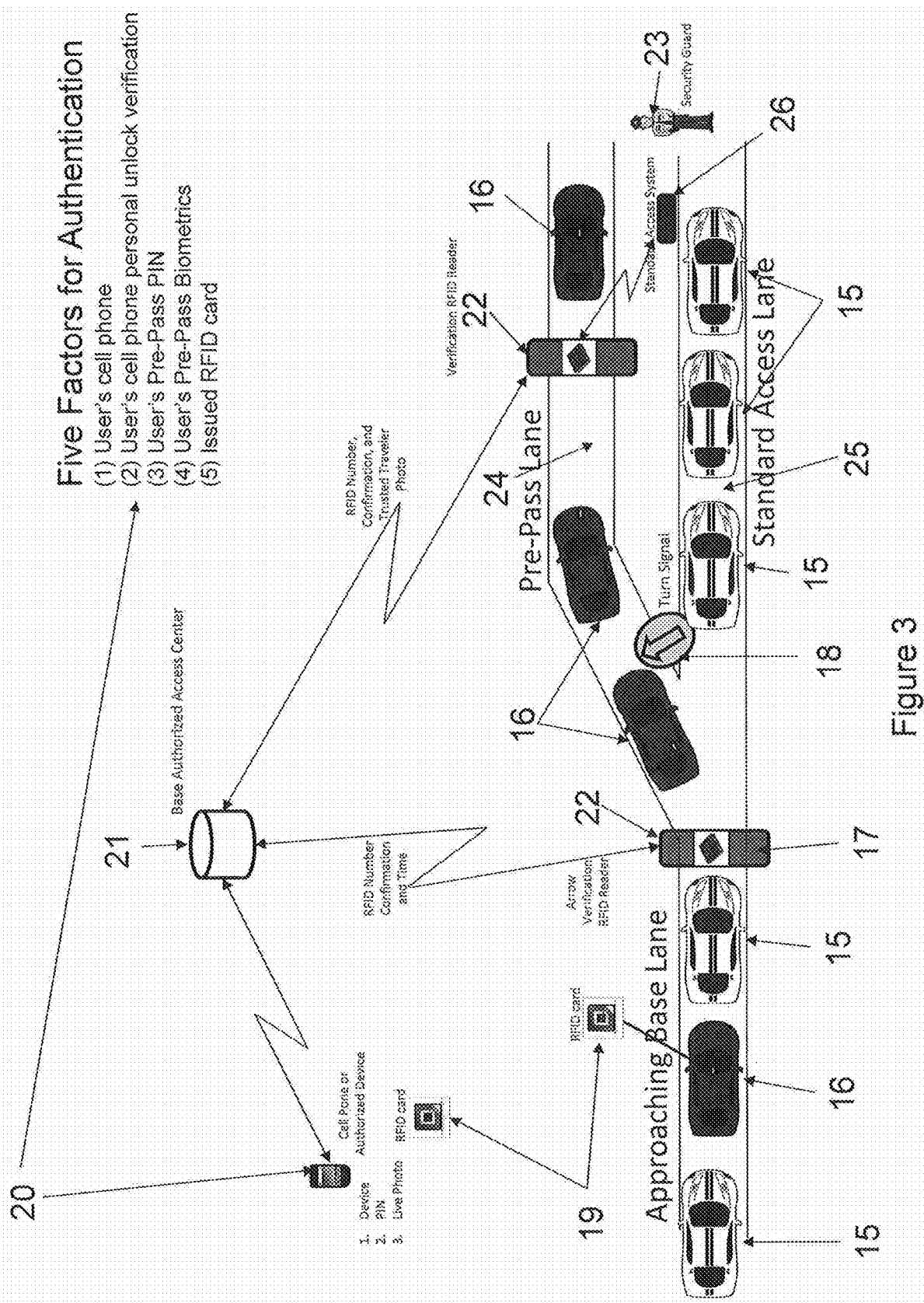
FIG. 3 illustrates an additional exemplary embodiment relating to a single lane approach a base that will further divide into a Fast Pass Lane in addition to the standard access lane.

The embodiment of FIG. 3 depicts several of the invention elements, linkages, and processes for the system. In particular, FIG. 3 depicts a configuration where a Pre-Pass Lane, element 24 is built to alloy the bypass of the Standard Access Lane, element 25. Cars and drivers, elements 16, intending to use the Pre-Pass Lane element 24 who have enrolled, requested access by providing authentication factors, element 20, are checked for identity and authorization to a facility and received a confirmation from the Base Authorized Access Center, element 21 indicating they will be granting access by virtue of activating their RFID code for a certain time or by some other method.

The Arrow Verification RFID Reader, element 17, is a computer equipped with an RFID reader. The computer receives confirmations from a central server at the Base Authorized Access Center, element 21, and can check to see if an RFID code read from a vehicle corresponds to a confirmation. If so, this computer will use arrow signal light element 19 to signal the driver to use the Pre-Pass Lane, element, 24. If not, this computer will use the arrow signal light, element 18 to signal the driver to remain in or change to the Standard Access Lane clement 25.

The arrow signal light, element 18, with one or more arrows used to direct drivers to use the Face Pass Lane (24) or too use the normal lane, element 25. This arrow light is controlled by computer Arrow Verification RFID Reader, element 17.

An RFID tag, element 19, associated with, a driver and optionally mounted inside the driver's car or otherwise readable by an RFID reader. The RFID tag, element 19, may be passive or active but may be read at a distance of 6 feet or more through automotive glass. Each RFID tag has a unique RFID code which is the information read by the RFID reader such as the Arrow Verification RFID Reader, element 17, or the Verification RFID Reader, element 22.

Five possible authentication factors, element 20, used to establish identity of the driver, element 3 which are enumerated. The enumerated authentication factors include a device code unique to the user's mobile phone or other device and which can be verified by the Base Authorization Access Center element 21; a personal identification number (PIN) which is a secret known only to the driver and the Base Authorization Access Center element 21; and a driver's face photo which the driver takes and submits using their device and which the Base Authorization Access Center element 21 can verify using an authoritative photo, a facial recognition algorithm, and an established threshold for a similarity metric calculated by the facial recognition algorithm when comparing the face photo to the driver's authoritative photo. Two other authentication factors include the driver's physical possession of the RFID card, element 19, and the driver's ability to use their device even though it is secured in some manner which implies the knowledge of a PIN or pattern, the driver's unique biometric, or some other unique factor used to secure the device. These authentication factors are sent by a driver intending to use the Face Pass Lane, element 22, in addition to the driver's identity number as part of an access request which is transmitted by the driver's device.

The Base Authorized Access Center, element 21, A data center, perhaps with human experts, that has connectivity with every driver's device and also with computers associated with every RFID reader at a base or other secure facility including the Arrow Verification RFID Reader, element 17, and Verification RFID Reader, element 22.

This data center is authorized by a base or other secure facility to determine the identity of drivers requesting access and to check to see if drivers should have access according to policy set by the base or other secure facility. This data center receives access requests from drivers, verifies the driver's identity and checks to see if the driver is authorized to visit, and if so, sends the driver a confirmation secret and also sends to RFID readers such as the Arrow Verification RFID Reader, element 17, or the Verification RFID Reader, element 22, the confirmation secret, driver's RFID code, and driver's identity number with, optionally, the driver's photo. The Verification RFID Reader, element 22, is a computer equipped with an RFID reader and a vehicle sensor. The computer receives confirmations from the Base Authorized Access Center element 21, senses vehicles passing, and can check and see if an RFID code read from a vehicle corresponds to a confirmation. If a vehicle passes the Verification RFID Reader, element 22, and either no RFID code is read or the RFID code read does not correspond to a current confirmation, then the Verification RFID Reader, element 22, will turn on a red/stop signal light which can optionally also trigger an audible alarm such as an electric bell to alert guards. These actions should result in stopping a driver who does not have a confirmation. The stopped driver will interact with a security guard element 23, who will provide further instructions. If a vehicle passes the Verification RFID Reader 22) and an RFID code is read that corresponds to a current confirmation, then this computer takes no action, permitting secure access through a gate via the Pre-Pass Lane, element 24.

A security guard, element 23, who can optionally have access to a workstation displaying useful information such as the photo of a confirmed driver, element 15, passing by in the Pre-Pass Lane, element 24, and who may also have access to an external system used for managing other, non-confirmed drivers, element 15, in the Standard Access Lane element 25.

The Pre-Pass Lane, element 24 is a traffic lane designed for on-the-move, secure vehicle access through a gate by confirmed drivers depicted as green vehicles, elements 16.

Standard Access Lane, element 25, is a traffic lane for general purpose access through a gate in which security is ensured using some other mechanism such as a manual ID card check by a guard, element 23, perhaps with an external system, element 26, and for drivers not intending to use the Pre-Pass Lane, element 24, depicted by red vehicles, element 15.

It should be understood that the foregoing relates only to preferred embodiments of the present invention and that numerous modifications or alterations may be made therein without departing from the spirit and scope of the invention as set forth in the appended claims. Such alternate embodiments are considered to be encompassed within the spirit and scope of the present invention. Accordingly, the scope of the present invention is described by the appended claims and supported by the foregoing description.

What is claimed is:

1. A method for allowing physical or logical access to a portal of facility or venue, the method comprising of following steps related to enrollment and access:

steps relating to enrollment include:
logging into a central server utilizing a mobile device;
transmitting to said central server a biometric template and radio frequency identification (RFID) code of an RFID device, from said mobile device;
verifying an identity of an individual enrolling on said central server;
storing said biometric template and said RFID code in a database on said central server;
providing a confirmation message from said central server to said mobile device that enrollment is complete for said verified individual;
steps relating to access include:
communicating an access request to a specific location and time window by said enrolled individual with said mobile device to said central server, by providing said biometric;
verifying identity on said central server and, if said biometric received from said mobile device matches said biometric template, if so, authorizing access of said individual to requested said specific location;
transmitting from said central server an access token to both said mobile device and a computer at said requested location;
transmitting, also, from said central server to said computer at specific requested location said RFID code associated with said individual;
reading said individual's associated RFID code from said RFID device by said computer as said individual approaches said specific location;
confirming, by said computer, that the access token has been received from said central server for said RFID code and said access token, is in time window, is valid; and,
if so, allowing wherein the individual seeking access to enter the facility by said computer.

2. The method of claim 1, wherein the biometric is one or more of a facial image, fingerprint, an image of an individual's iris, or an individual's heart rhythm.

3. The method of claim 1, further including an additional personal identification number (PIN) for further authentication of the individual.

4. The method of claim 1, whereby the central server is operating in an internet cloud.

5. The method of claim 1, further including a time-based one-time password from an individual's mobile device based on a code from a central server to said mobile device as part of a confirmation message at an end of enrollment.

6. The method of claim 1, wherein the access token on the individual's mobile device is compared separately.

7. The method of claim 1, wherein the RFID code is replaced by a bar code.

8. The method of claim 1, wherein the portal is a door to a building.

9. The method of claim 1, wherein the portal is a facility gate.

10. The method of claim 1, wherein the portal is a computer.

11. The method of claim 1, wherein time window expires after some period of time.

12. The method of claim 1, wherein the specific location is further confirmed by a global positioning system location of the mobile device.

* * * * *